United States Patent
Abersfelder et al.

(10) Patent No.: US 6,714,327 B1
(45) Date of Patent: *Mar. 30, 2004

(54) USE OF A HOLOGRAPHIC VIDEO SCREEN AS A DISPLAY SURFACE IN A VEHICLE

(75) Inventors: Guenter Abersfelder, Sindelfingen (DE); Helmut Grantz, Sindelfingen (DE); Thorsteinn Halldorsson, Munich (DE); Horst Schmidt-Bischoffshausen, Neubiberg (DE); Stefan Uhl, Stuttgart (DE); Heinrich Alexander Eberl, Probstried (DE)

(73) Assignees: DaimlerChrysler AG, Stuttgart (DE); Herr Heinrich A. Eberl, Probstried (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,060

(22) Filed: Jul. 17, 1998

(30) Foreign Application Priority Data

Jul. 17, 1997 (DE) .......................... 197 30 563

(51) Int. Cl.$^7$ ............................... G03H 1/00
(52) U.S. Cl. ........................ 359/13; 359/22; 359/15; 359/32; 359/460; 359/443; 345/9; 353/14
(58) Field of Search ..................... 359/13, 14, 15; 345/7, 9; 353/13, 14

(56) References Cited

U.S. PATENT DOCUMENTS

| | | | |
|---|---|---|---|
| 4,372,639 A | | 2/1983 | Johnson |
| 4,831,366 A | * | 5/1989 | Iino .......................... 340/705 |
| 4,908,611 A | * | 3/1990 | Iino .......................... 353/14 |
| 4,967,191 A | * | 10/1990 | Iino .......................... 353/14 |
| 5,037,166 A | * | 8/1991 | Malcolm et al. ............... 359/15 |
| 5,112,121 A | | 5/1992 | Chang et al. ................. 359/15 |
| 5,164,848 A | * | 11/1992 | Firth et al. .................. 359/13 |
| 5,243,448 A | * | 9/1993 | Banbury ...................... 359/13 |
| 5,278,532 A | | 1/1994 | Hegg et al. |
| 5,313,317 A | * | 5/1994 | Saburi et al. ................. 359/13 |
| 5,497,170 A | * | 3/1996 | Kato et al. .................... 349/9 |
| 6,198,554 B1 | * | 3/2001 | Kanda et al. .................. 359/15 |
| 6,288,805 B1 | | 9/2001 | Huignard et al. .............. 359/28 |
| 6,313,931 B1 | * | 11/2001 | Gnaedig et al. ............... 359/15 |
| 2002/0154349 A1 | * | 10/2002 | Halldorsson et al. .......... 359/15 |

FOREIGN PATENT DOCUMENTS

| | | |
|---|---|---|
| DE | 3735983 | 5/1989 |
| DE | 4445555 | 6/1995 |
| EP | 0 445 824 A1 | 9/1991 |
| JP | 63-57130 | 4/1988 |
| JP | 1-158236 | 11/1989 |
| JP | 6-183285 | 7/1994 |
| JP | 7-140918 | 6/1995 |
| JP | 8-261827 | 10/1996 |

OTHER PUBLICATIONS

Shie et al. "Surface Relief Holography for Use in Display Screens." *Physical Optics Corporation*, SPIE vol. 2407, pp. 177–184, Aug. 1995.

Veligdan, James T. "Unique Interactive Projection Display Screen." *Brookhaven National Laboratory*, Upton, New York.

* cited by examiner

*Primary Examiner*—John Juba
*Assistant Examiner*—Fayez Assaf
(74) *Attorney, Agent, or Firm*—Crowell & Moring LLP (57) ABSTRACT

The use of a holographic video screen which appears black, gray or colored in ambient light as the display surface in a vehicle, wherein a driver can view the screen while driving without taking his eyes of the road. Additionally, the display system containing such a video screen permits the projection and viewing of multiple images on a single screen.

22 Claims, 5 Drawing Sheets

USE OF A HOLOGRAPHIC VIDEO SCREEN AS A DISPLAY SURFACE IN A VEHICLE

This application is related to co-pending U.S. patent application Ser. No. 09/116,710, filed Jul. 17, 1998 in the name of GUENTER ABERSFELDER et al.

This application claims the priority of German Patent No. 197 30 563.6, filed Jul. 17, 1997, the disclosure of which is expressly incorporated by reference herein.

The present invention relates to the use of a holographic video screen as a display surface in a vehicle, as well as to a display system in a vehicle.

The vehicle category includes, for example, motor vehicles, trains, special vehicles, airplanes and ships. Various embodiments have become known as display units and display video screens (displays) for use in motor vehicles. It is known, for example, to provide mechanical indicator instruments which may be constructed as an instrument cluster and display various information (for example, vehicle speed, covered distance, time of day, rotational engine speed and optionally additional quantities). Furthermore, it is known to construct displays as LCD video screens. It has also been suggested to provide a holographic display in the windshield area. In the case of this latter application, it is advantageous that the virtual image display can be applied to a distance such that, relative to the distance of the display with respect to the distance of the observed traffic situation, no adjustment of the driver's vision is required.

German patent documents 197 00 162.9 and 197 03 592.2, which are not prior art, disclose the provision of a holographic video screen for a laser front projection and a laser rear projection. In normal ambient light, this video screen is black. However, for certain wavelengths of the light, this video screen can be constructed such that this light is transmitted and reflected at a certain fixed angle. According to these references, this screen does not require a plane construction. On the contrary, it is possible to construct this video screen with an almost arbitrary surface contour. For details relative to the video screen, the disclosures of the above-referenced German patent documents are expressly incorporated by reference herein.

From non prior art reference, Veligdan, James T. "Unique Interactive Projection Display Screen." Brookhaven National Laboratory, Upton, N.Y., systems utilizing Sheimpflug type optics are known. For details regarding such Sheimpflug type optical devices, the disclosure of the above-referenced document is expressly incorporated by reference herein.

In the holographic video screen according to the invention, the contrast of the screen is significantly improved because the ambient light is absorbed by the video screen. It is significantly easier for the driver to recognize the display of vehicle-specific or driving-situation-specific quantities, such as, for example, a holographic display of the speedometer. Furthermore, in comparison to conventional display units, space requirements are considerably reduced. In contrast to other display units, the amount of current required is reduced. This reduction leads to an increase in the contrast performance of the screen. As a result, it becomes possible to reduce the video screen brightness by the black background.

In contrast to conventional light generation, when laser beams are used for generating the images, a further considerable reduction of the required current is possible. This is because no infrared light and therefore no corresponding heat radiation is generated. The power consumption is typically from 1.25% (LCD projection) to 10% (CRT projection) in comparison to conventional systems. This is advantageous, for example, with respect to the charging balance of the battery.

The driver's viewing angle with respect to the screen can be almost arbitrarily defined. With respect to its surface design, the video screen is flexible. As a result, sharp edges can be avoided. This has an advantageous effect with respect to passive safety in the event of a crash. In addition, the surface of the video screen is flexible with respect to its dimension and shape. An emission of the image information of the holographic video screen takes place in an angular area, which is defined and adjustable during the generation of the hologram of a video screen (preferably toward the viewer). This has the result of preventing undesirable reflections, for example, in the windshield. Since external light through the windshield logically radiates from a different direction on the surface than the projection system and the color of the light also deviates from the color of the light of the projection system, the external light does not interfere with the actual image information. For this reason, no special shading (for example, hoods or scoops) is required which saves cost and space and results in more design freedom.

According to advantageous embodiments of the invention, the video screen is black, or preferably of a dark color in order to achieve a good contrast. According to design-related requirements, the video screen can also be constructed in gray, or of another color.

In another embodiment of the present invention, the video screen operates in a direct front projection system. In another embodiment according to the invention, the video screen operates in a transmitted-light projection system. Using these two advantageous projection embodiments, it is possible to mount the projection system corresponding to the available installation space in the motor vehicle. Thus, for example, the projection system can be constructed on the driver's side as a transmitted-light projection. This is because, in comparison to the previous speedometers, installation space is saved behind the dashboard. On the front passenger side, the projection system may, under certain circumstances, be constructed as a projection system utilizing direct front projection because the available space behind the dashboard is limited due to the presence of the air bag and the glove compartment.

In yet another embodiment of the present invention, the video screen is constructed such that its surface is soft. As a result, the passive safety of the vehicle can be taken into account if possible surfaces, on which a vehicle occupant may impact in the event of an accident, are constructed in a correspondingly soft manner.

In still another embodiment of the invention, the video screen is arranged in the driver's viewing area below the windshield. Advantageously, such a video screen can be used instead of previously used dashboard inserts behind the steering wheel. Using a projection system, the corresponding information can be displayed to the vehicle driver.

In another embodiment of the invention, the video screen is arranged in the viewing area of the front passenger below the windshield. Because of its location, the video screen can be easily assigned to the front passenger.

In even another embodiment of the invention, the video screen is at least essentially mounted on the covering of an air bag. In this case, it is advantageous that the covering of the air bag cannot be used as an area to deposit objects because these may disturb the air bag in the event of the air bag triggering during an accident. Since the covering of the air bag is therefore always free of objects, an undisturbed display of an image is also possible.

In a further embodiment of the invention, the video screen is essentially mounted on the cover of the glove compartment. Since the cover of the glove compartment can not be used as a surface upon which objects are placed and is also arranged within the grasp of the front passenger, this cover is also suitable for use as a surface of the video screen.

In still another embodiment of the invention, the video screen is arranged in at least one of the two lateral surfaces of the center dome of the vehicle. This provides good overall visibility for the driver and the front passenger.

In a further embodiment of the invention, the video screen is arranged on the surface of the center dome. As a result of this arrangement, in cases of a corresponding fixed angle, the video screen can be seen by all vehicle occupants.

In yet another embodiment of the invention, the video screen is arranged on a slightly bent surface of the ceiling (in the center area of the forward area of the vehicle). Here, the video screen can (for example) be irradiated by at least one projection system which is arranged in the rearward area of the vehicle. The video screens are then highly visible at correspondingly adjusted fixed viewing angles by the rear occupants of the vehicle.

In another embodiment of the present invention, an illumination device is situated behind the slightly bent surface of the ceiling. As a result of positioning the illumination device behind the surface, the space formed is utilized. Moreover, the projection of the illumination device may advantageously be in the direction of the rear occupants' knee areas and may optionally be rotatable.

In an even further embodiment of the invention, the video screen may be mounted behind and/or on the interior side of a sun visor. This results in an optimal utilization of the space.

In yet another embodiment of the current invention, the video screen is mounted on the rear surface of the headrests of the front seats. This allows the rear occupants to see the video screen without turning their heads. Here, the usable video screen surface can correspond to the overall size of the headrest and, with respect to its external shape, may be adapted to the contour of the headrest.

In still another embodiment of the invention, the video screen is larger than the projection surface on the video screen. As a result, no readjustment of the projection system's projection onto the video screen is required when the front seat is adjusted.

According to another embodiment of the invention, a change of the direction of the projection system takes place with an adjustment of the front seat and/or of the headrest of the front seat. This advantageously adapts the projection direction of the projected image when the front seats are adjusted to an optimum direction.

In another embodiment of the invention, the video screen is used as part of a display system of a motor vehicle. In addition to the video screen 3, the display system has at least two projection systems. Here, the images of the two projection systems are visible from the same viewing angle. As a result, for example, mutually overlapping images can be displayed. It is also possible to display a speedometer, where a first image represents the scaling of the speedometer. Another image may display the indicator position corresponding to the momentary speed. This enables the display of a speedometer by superimposing the two images.

In a further embodiment of the present invention, the projection systems have different colors. This results, for example, in better recognition of the indicator position.

In yet a further embodiment of the present invention, the video screen is used as part of a display system of the motor vehicle. Here, the display system has at least two projection systems in addition to the video screen. In the present embodiment, the images of the two projection systems are visible from different viewing angles. As a result, via a video screen, different images can be displayed for several occupants of the vehicle. Vehicle-specific, driving-condition-specific and driving-situation specific data can, for example, be displayed to the vehicle driver, while other information, such as a video or tourist-type information concerning the region through which the automobile is driving, can be displayed to the other vehicle occupants.

In still another embodiment of the invention, at least two projection systems exist for the at least one video screen. The images of the projection systems can be seen from different viewing angles. This, in essence, is an advantageous combination of several of the inventive embodiments.

In correspondence with the indicated uses, the video screens can be arranged such that undesirable reflections are avoided, because the video screen principle and other light influences have no contrast-reducing effect on the screen.

Other objects, advantages and novel features of the present invention will become apparent from the following detailed description of the invention when considered in conjunction with the accompanying drawings.

DETAILED DESCRIPTION OF THE DRAWINGS

After the activation of at least one projection system, the video screen is either irradiated in a scanning manner via a laser or in an aerial manner by a suitable light source, such as a halogen lamp. In this case, the laser is modulated in a manner corresponding to the desired or required image information. Alternatively, the image content is superimposed on the aerial projection through the use of light relays, such as slides or a transparent small LCD screen. Three colors (RGB) can be used for a full color display (red, green and blue).

When the modulated projection beam impinges on the video screen as a black projection surface, a bright, high-contrast image is created from the observer's viewing angle at a viewing distance which must not be identical to the plane of the projection surface. This viewing distance can also be represented at a relatively large distance from the eye which facilitates the accommodation of the eye. In addition, it is possible to implement a three-dimensional display. In this case, the virtual image display, the projection angle and the viewing angle, which are variable within wide ranges, can be adjusted in wide ranges when producing the holographic video screen.

The display system can be implemented as a direct front projection or as a transmitted light projection. The transmitted light projection requires a dark box as a light trap in order to prevent a backscattering of impinging other light.

The projecting direction is not identical to the viewing direction, but is arranged at an angle thereto. The projection angle onto the video screen surface is freely selectable and must not be 90°. Likewise, the viewing angle onto the video screen surface should also be anything except a right angle.

Figure 1:
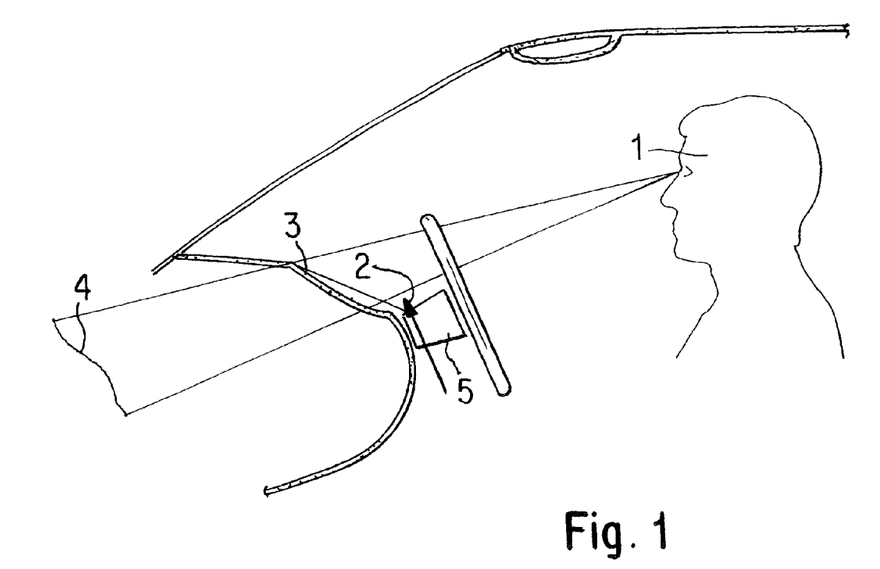
FIGS. 1 to 9 are views of different mounting possibilities of a video screen in a motor vehicle according to preferred embodiments of the present invention.

FIG. 1 shows a display system consisting of a video screen 3 and a projection system 2. In the illustrated embodiment, the video screen surface is the area in which the instrument cluster is normally situated which, inter alia, contains the speedometer. Advantageously, any mechanical or electric/electronic display will no longer be required in this area. The surface may therefore be the softly cushioned surface of the dashboard which is built according to design-related requirements. It is coated only with the flexible holographic material. The holographic video screen 3 is irradiated by a small projection system 2 which is situated on the surface of the steering column tube 5. The vehicle driver 1 sees the virtual image 4 at a distance which requires no adjustment of the drivers eyes to the display.

Figure 2:
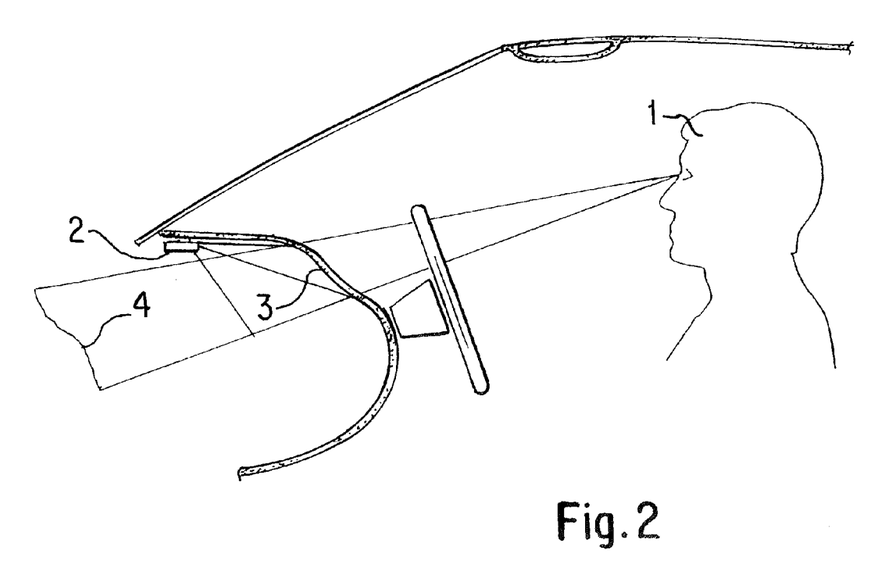

FIG. 1 shows the arrangement which produces a direct front projection. However, it is also possible to construct the arrangement as a transmitted-light projection system, as illustrated in the embodiment of FIG. 2. In this case, the video screen is constructed as a transparent video screen. The projection system 2 in this embodiment is situated in a closed dark box.

Figure 3:
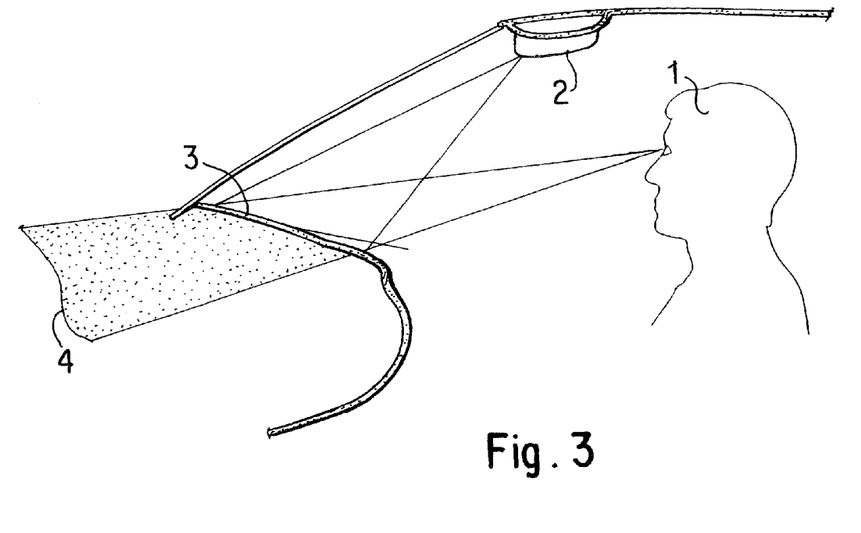

FIG. 3 illustrates a display system for a front passenger. In this illustrated embodiment, the video screen is applied to the covering of the air bag. The projection system 2 is mounted in the roof area of the vehicle. In this embodiment, the front passenger 1 sees the virtual image 4.

Figure 4:
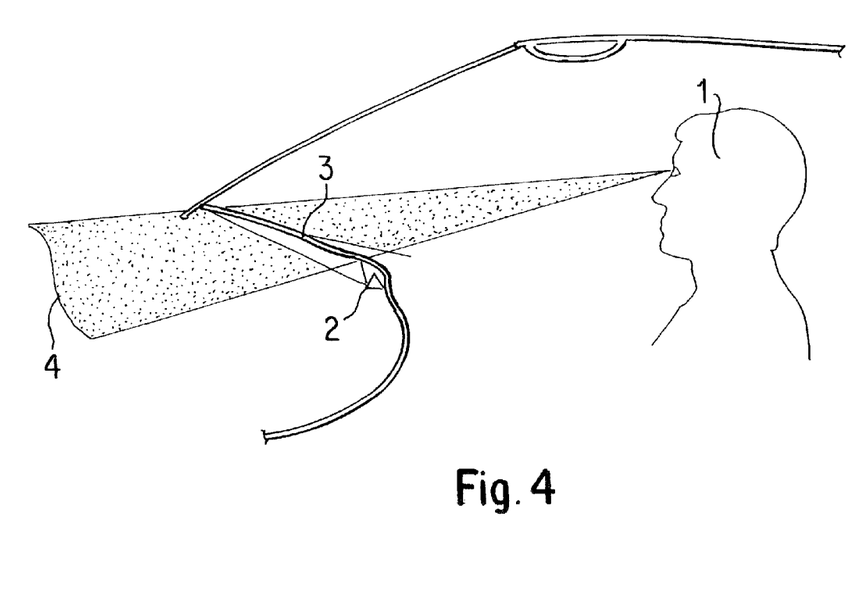

FIG. 4 shows a similar arrangement, for example, in the center of the dashboard using a transmitted-light projection. The video screen 3 is again constructed as a transparent video screen.

Figure 5:
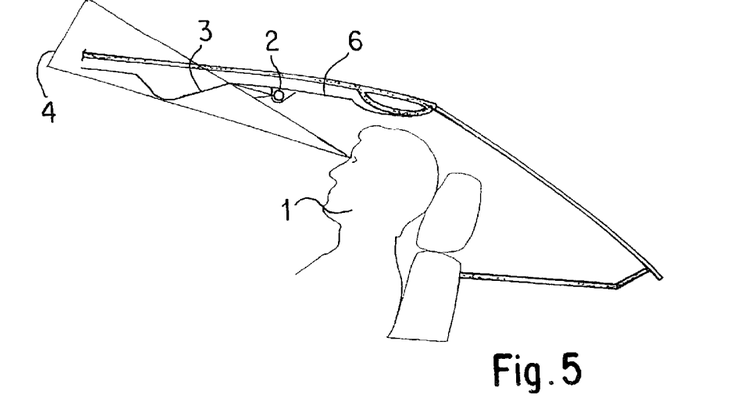

FIG. 5 illustrates a display system for a rear occupant 1. The video screen 3 is mounted on a corresponding sloped section of the ceiling 6. The projection system 2 is also laterally mounted on the ceiling. Here, the rear occupant 1 sees the virtual image 4.

Figure 6:
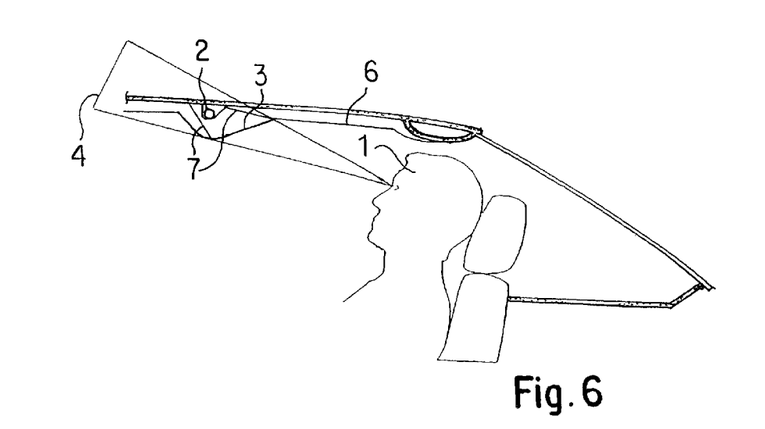

While FIG. 5 shows a system that generates a direct front projection, FIG. 6 shows a system for producing a transmitted-light projection. In this case, the video screen 3 is again constructed as a transparent video screen. The projection system 2 is arranged, in the viewing direction, behind the video screen 3. The side walls 7 are advantageously made of a light-absorbing material in order to increase the contrast of the image.

Figure 7:
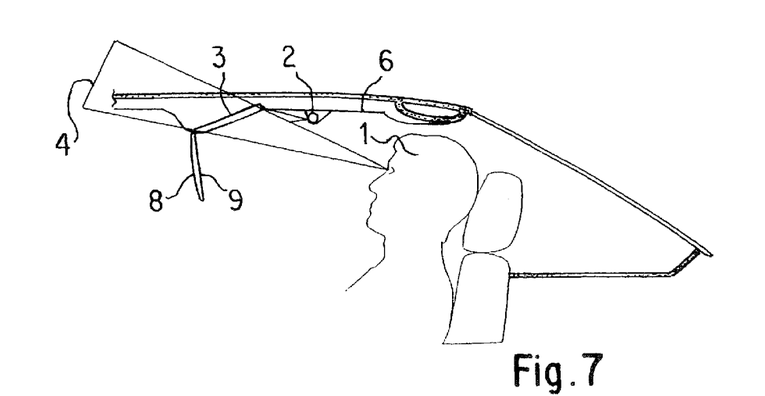

FIG. 7 shows an arrangement of the video screen in which the screen can also be mounted behind or on the interior side 9 of a sun visor 8. Otherwise, it is the same arrangement as in FIG. 5 and therefore requires no further explanation. Naturally, such mounting possibilities exist also on the sun visor in the front passenger side of the vehicle.

Figure 8:
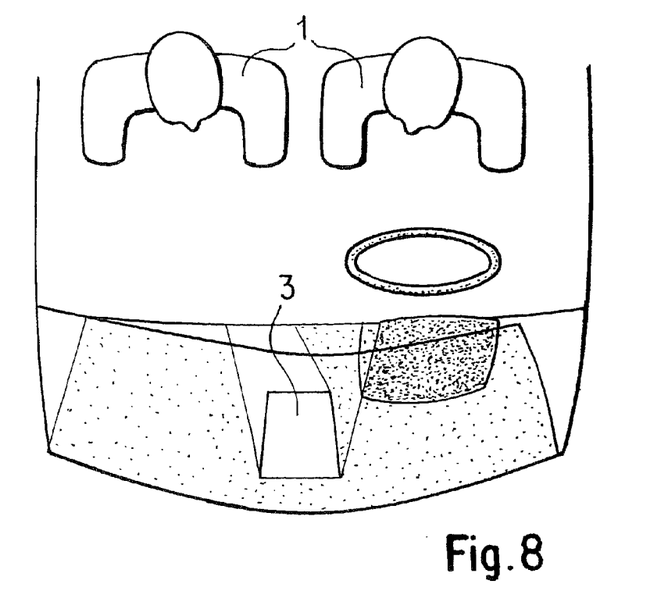

FIG. 8 shows a video screen similar to FIG. 4 which is arranged in the forward area of the vehicle in the center. Here, different information is displayed for the vehicle driver and the front passenger. In this case, the two corresponding fixed angles (viewing angles) are assigned to different projection systems which are not indicated in the representation of FIG. 8.

Figure 9:
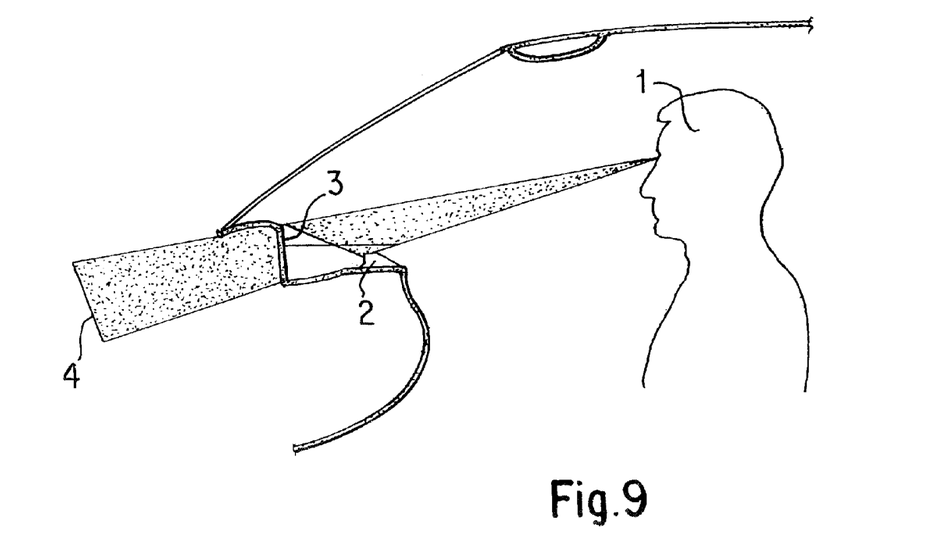

FIG. 9 shows a video screen which is sloped in a manner that is better suited to the viewing direction of the front passenger. The system illustrated in FIG. 9 relates to the process of the direct front projection by the projection system 2 which is hidden behind the covering for the front passenger.

Figure 10:
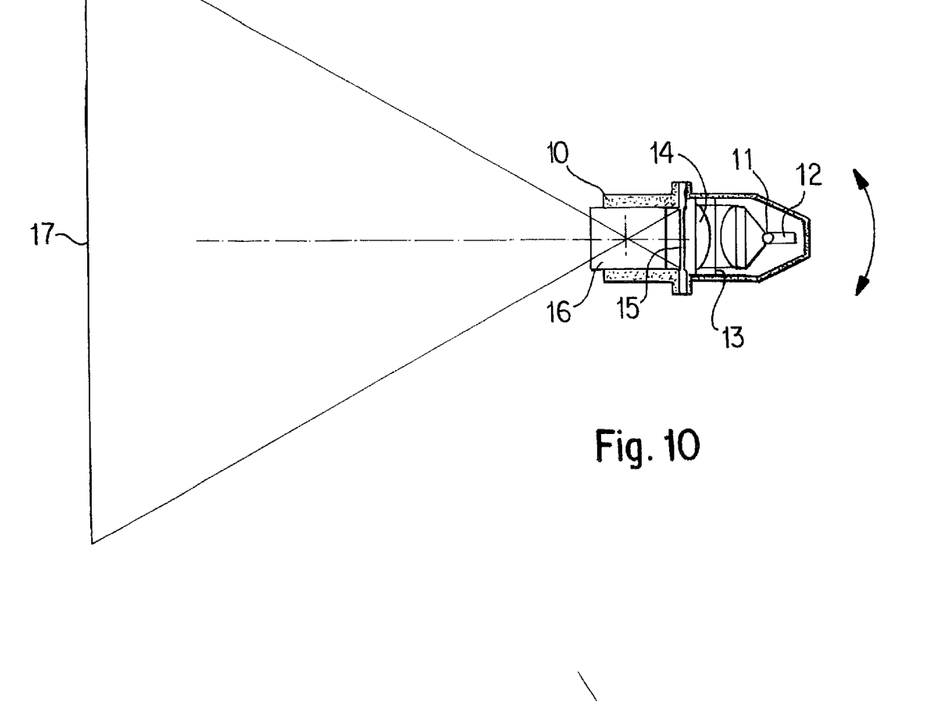
FIGS. 10 and 11 are views of preferred embodiments of projection systems.

FIG. 10 shows a first embodiment of a projection system 10. A light bulb 11 and an ellipsoid reflector 12 are situated in the projection system 10. The light is supplied to a display 15, e.g., a holographic video screen such as an LCD display, via a heat protection filter 13 and a condenser 14. A lens 16 is also provided. Reference number 17 indicates the projection surface. This is a projection system for a holographic display with white light and a small LCD display 15 in the beam path. As indicated by the arrow, the projection system may be rotatable in a conventional manner, for example, so as to change the projection direction to accommodate a movement of the viewing screen.

Figure 11:
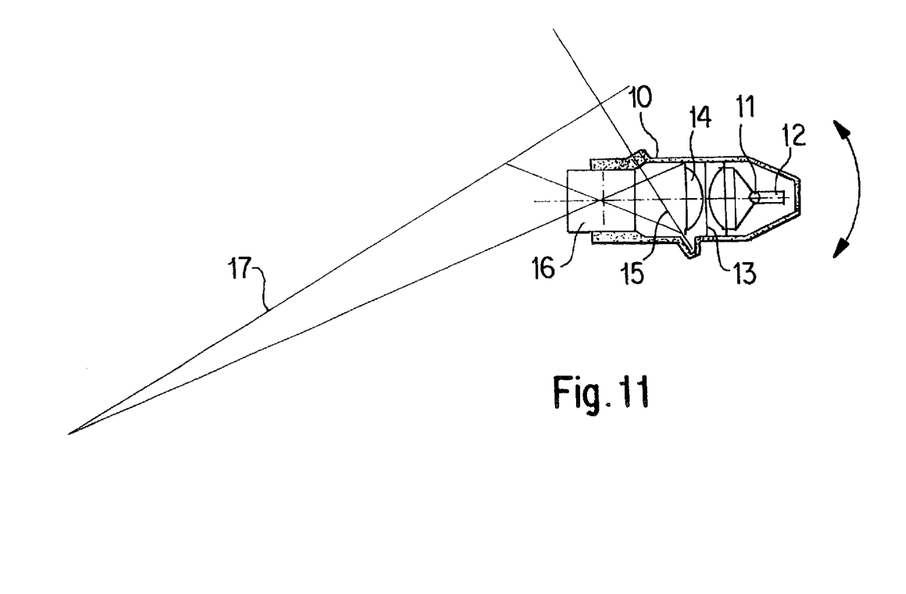

FIG. 11 shows a diagonal projection system with Scheimpflug optics in another embodiment of the projection system. Identical components with respect to FIG. 10 have the same reference numbers.

The dimensions of both projection systems measure only a few centimeters. The video screens corresponding to FIGS. 1 to 4 and 8 may be arranged such that, as the result of the video screen principle, undesirable reflections are avoided and influences of other light do not have a contrast-reducing effect.

Other mounting possibilities for the video screen, as well as for the projection system, are also contemplated which are not shown in the figures and will only be described here.

The video screen surface can, for example, be mounted on the lateral surfaces of the center dome. The pertaining projection system can, for example, be situated laterally on the steering column tube or below the dashboard. This may take place, not only on the driver side, but also on the front passenger side. In this instance, the projection system would have to be mounted on the underside of the dashboard. This permits, for example, a television or video display for the front passenger without disturbing the driver of the vehicle.

Furthermore, the video screen surface can be mounted on the surface of the center dome. The projection system can be arranged out of the plane area in front of the shift lever with an upward projecting direction. If shading or contamination is to be avoided, a transmitted-light projection can, for example, also take place, i.e., the video screen surface is irradiated from the interior side of the center dome.

The viewing angle in the case of the video screens is basically freely adjustable. Another contemplated design consists, for example, of the fact that in the case of a transmitted-light projection, the video screen surface may be a component of the projection system.

In the aforementioned embodiments, the video screen is the hologram of a projection surface which is preferably white. This surface is mounted either on a light-absorbing matte black, colored or gray base. Alternatively, for the transmitted-light projection, the video screen is mounted in front of a light-absorbing matte black box onto a transparent surface. In the latter case, the outlet opening of the projection unit is within this box.

The viewing plane of the virtual image, the projection angle and the viewing angle, as well as the opening of these two angles, are construction parameters which can be adjusted during the production of the hologram. The projection angle and the viewing angle may, for example, be uniaxial.

The aperture of the projection angle is advantageously kept small. The aperture of the viewing angle depends on whether viewing by several persons is desired (relatively large aperture angle) or whether a blanking-out of the information is to take place in other directions (relatively small aperture angle). For avoiding undesirable reflections, the viewing angle should be adjusted such that, although its width is large enough, its height is considerably limited.

Construction with a relatively small aperture angle has the advantage that the full contrast of the video screen is always achieved in bright ambient light. As a result, only the reflections on the protective covering of the video screen surface may have a contrast-reducing effect. For this reason, the screen should advantageously be reflection-reduced, in a manner similar to the technology used for reducing reflections in eyeglasses.

The following are characteristics of the hologram. In the viewing direction, the video screen will always seem black or the same color as the base, as long as no narrow-band light impinges on it from the projection direction. Wide-band ambient light does not result in a backscattering in the viewing direction. As a result of this, the video screen appears black or the same color as its base. In addition, narrow-band light from a direction other than the adjusted projection direction does not result in backscattering. In this case, the video screen appears black or the same color as its base.

The hologram can be constructed such that it contains several pairings of projection angles and viewing angles. In this case, at least one angle of a pair must differ from that of the other pair or of additional pairs. Furthermore, several projection systems can simultaneously beam from several directions onto the same video screen surface. Thus, it is possible to simultaneously transmit different image information in different viewing directions. In this manner, image information for one viewing direction is blanked out for the other viewing direction. In this manner, for example, the driver can see information of the navigation system, while, on the same video screen surface, the front passenger simultaneously views a video (advantageously listening to audio by means of head sets) without influencing one another. Also in the rear area, the rear occupants can be supplied with different information in this manner. Furthermore, it is possible for several projection systems to beam simultaneously from the same approximate direction. In the viewing direction, this results in a superimposition of two different types of image information (for example, for the indicator displace of a speedometer in front of a constant background).

One or several colored lasers, which are modulated in a manner corresponding to the image information to be generated, can be used for the projection. For a full-color display, advantageously one red, one green and one blue laser beam respectively are used. In a manner which is know, these laser beams are uniaxially superimposed via partially transmitting mirrors and are transmitted to the video screen via a single scanner system.

Because of the special manufacturing method, narrow-band light (for example, light of a halogen lamp) can also be used for the projection system. This light can, for example, be modulated by suitable light relays (such as a small LCD-screen or a highly resolved representation of a constant image). In this case, only the light wavelengths of the white light result in a backscattering which correspond to the laser wavelengths with which the hologram was made. Nevertheless, the mixing of the wavelengths and their brightness, modulated by the light relay with respect to the brightness, results in a full-color display.

For example, for the instrument cluster, a projection with several projection systems is suitable. On the one hand, it is possible to display the background or the dial by the light projection (white or colored) of a highly resolved slide. For this purpose, a simultaneous display of the indicators and/or warning displays, as well as additional information, can take place via one or several lasers or by light projection. When several projection systems with different colors are used, a spatial staggering of the virtual image is possible. Such a spatial staggering is also possible if the projection takes place via several projection systems of the same light color from different directions (in the case of a corresponding construction of the hologram). These possibilities can also be implemented in other video screens in the vehicle, for example, on the front passenger side and in the rear area.

Because the hologram extends to the edge, a frame is therefore not required. In this manner, it is possible to mutually adjoin identical holograms, or holograms of a different construction, in an optically seamless manner and to provide them with a joint covering. This provides new design possibilities and the option of a panoramic display of the image information. By using a variable and/or programmable laser scanner, it is possible to variably display different video screen boundaries and image formats.

The holographic video screen is not a system which must meet functional demands. For this reason, a simple trimming of the video screen boundary is possible. An edgeless construction is also conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of projecting holographic images, comprising:
   providing a holographic screen having a hologram recorded therein;
   projecting at least one light beam containing image information at at least one predetermined wavelength onto said holographic screen at a predetermined projection angle; and
   back scattering, via said holographic screen, a portion of said light beam containing said image information, to generate a virtual holographic image that is visible at a predetermined viewing angle; wherein
   said virtual holographic image appears in at least one viewing plane at a location which differs from a location of the holographic screen; and
   said hologram in said holographic screen comprises a holographic recording of a white projection surface.

2. The method of projecting holographic images according to claim 1, wherein said holographic screen comprises flexible holographic material.

3. The method of projecting holographic images according to claim 1, wherein said holographic screen is directly applied to an ambient light-absorbing surface.

4. The method of projecting holographic images according to claim 3, wherein said ambient light-absorbing surface is one of a dashboard, an airbag cover, a glove compartment cover, a surface of a center dome, an interior side of a sun visor, and a rear surface of a headrest of a front seat of said vehicle.

5. The method of projecting holographic images according to claim 1, wherein:
   said holographic screen is a rear surface of a headrest of a front seat of said vehicle; and
   a projecting direction of a projection system that projects said light beam is adjusted corresponding to adjustment of one of said front seat and said headrest, such that said light beam impinges upon said holographic screen at said predetermined projection angle.

6. The method according to claim 1, wherein a distance from a viewing point, which is within said predetermined viewing angle, to the at least one viewing plane differs from a distance from the viewing point to the projection surface.

7. The method according to claim 6, wherein:
said at least one light beam comprises a plurality of predetermined different wavelengths; and
said virtual image is visible from said viewing point, and appears in a plurality of viewing planes corresponding to said plurality of wavelengths, which viewing planes are spatially staggered along a viewing direction from said viewing point.

8. The method according to claim 6, wherein:
said projecting step includes projecting a plurality of light beams, from different projection angles;
said virtual image is visible from said viewing point, and appears in a plurality of viewing planes corresponding to said plurality of light beams, which viewing planes are spatially staggered along a viewing direction from said viewing point.

9. The method according to claim 1, wherein said virtual holographic image comprises said image information displayed on said projection surface recorded in said holographic screen.

10. The method according to claim 9, wherein said image information comprises vehicle instrumentation which characterize operation parameters of said vehicles.

11. The method according to claim 1, wherein:
the image information contained in the at least one light beam comprises an image of vehicle instrumentation that characterizes operation of said vehicle; and
said virtual image comprises said vehicle instrumentation superimposed on said projection surface.

12. The method according to claim 11, wherein:
said at least one light beam comprises first and second light beams;
said first light beam contains information defining a first image of the scaling of a vehicle instrument; and
said second light beam contains information defining an indicator position superimposed on said instrument scaling.

13. A holographic display system, comprising:
a holographic screen having a hologram therein; and
a projection system for projecting at least one light beam containing image information at at least one predetermined wavelength onto said holographic screen at a predetermined projection angle, such that said holographic screen backscatters a portion of said light beam containing said image information to generate a virtual holographic image that is visible at a predetermined viewing angle; wherein
said virtual holographic image appears in at least one viewing plane at a location which differs from a location of the holographic screen; and
said hologram in said holographic screen comprises a holographic recording of a white projection surface.

14. The holographic display system according to claim 13, wherein said holographic screen comprises a flexible holographic material.

15. The holographic display system according to claim 13, wherein said holographic screen is directly applied to an ambient light-absorbing surface.

16. The holographic display system according to claim 15, wherein said ambient light-absorbing surface is one of a dashboard, an airbag cover, a glove compartment cover, a surface of a center dome, an interior side of a sun visor, and a rear surface of a headrest of a front seat of said vehicle.

17. The holographic display systems according to claim 13, wherein
said holographic screen is a rear surface of a headrest of a front seat of said vehicle; and
a projecting direction of said projection system is adjusted upon adjustment of one of said front seat and said headrest, such that said light beam impinges upon said holographic screen at said predetermined projection angle.

18. The display system according to claim 13, wherein a distance from a viewing point, which is within said predetermined viewing angle, to the at least one viewing plane differs from a distance from the viewing point to the projection surface.

19. The display system according to claim 18, wherein:
said at least one light beam comprises a plurality of predetermined different wavelengths; and
said virtual image is visible from said viewing point, and appears in a plurality of viewing planes corresponding to said plurality of wavelengths, which viewing planes are spatially staggered along a viewing direction from said viewing point.

20. The display system according to claim 18, wherein:
said projecting step includes projecting a plurality of light beams, from different projection angles;
said virtual image is visible from said viewing point, and appears in a plurality of viewing planes corresponding to said plurality of light beams, which viewing planes are spatially staggered along a viewing direction from said viewing point.

21. The display system according to claim 13, wherein said virtual holographic image comprises said image information displayed on said projection surface recorded in said holographic screen.

22. The display system according to claim 21, wherein said image information comprises vehicle instrumentation which characterize operation parameters of said vehicles.

* * * * *